Oct. 30, 1962  H. C. SWIFT  3,061,051
BRAKE ASSEMBLY
Filed April 12, 1961  2 Sheets-Sheet 1
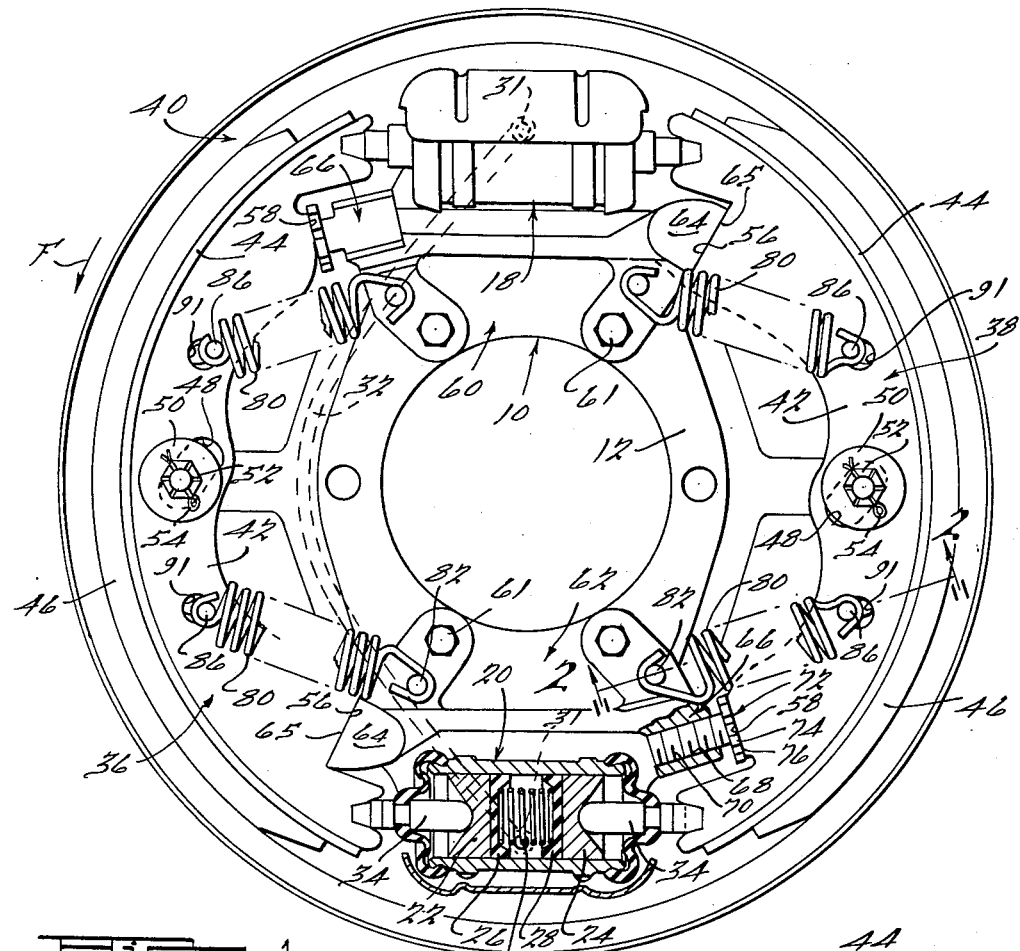
FIG. 1.
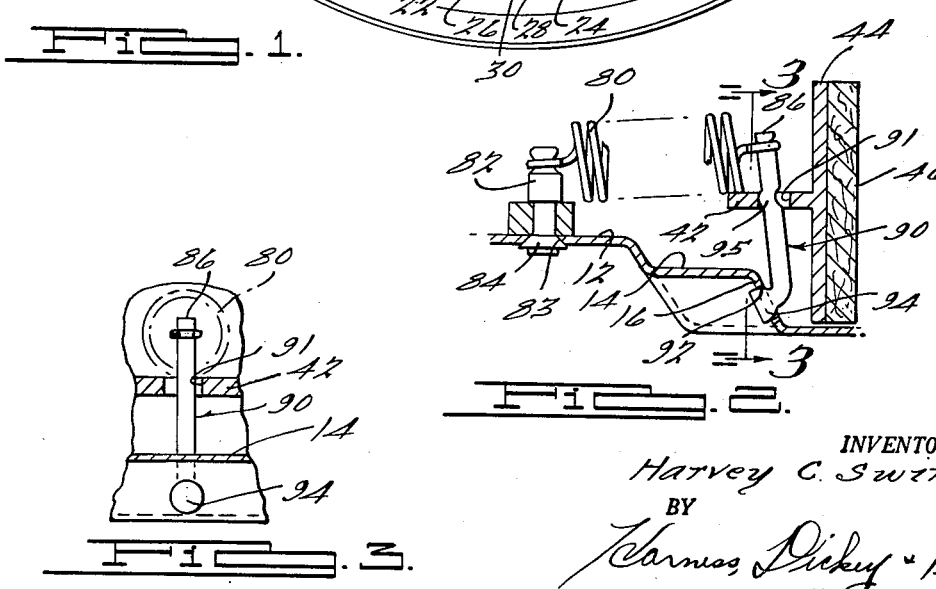
FIG. 2.
FIG. 3.
INVENTOR.
Harvey C. Swift
BY
Harness, Dickey & Pierce
ATTORNEYS

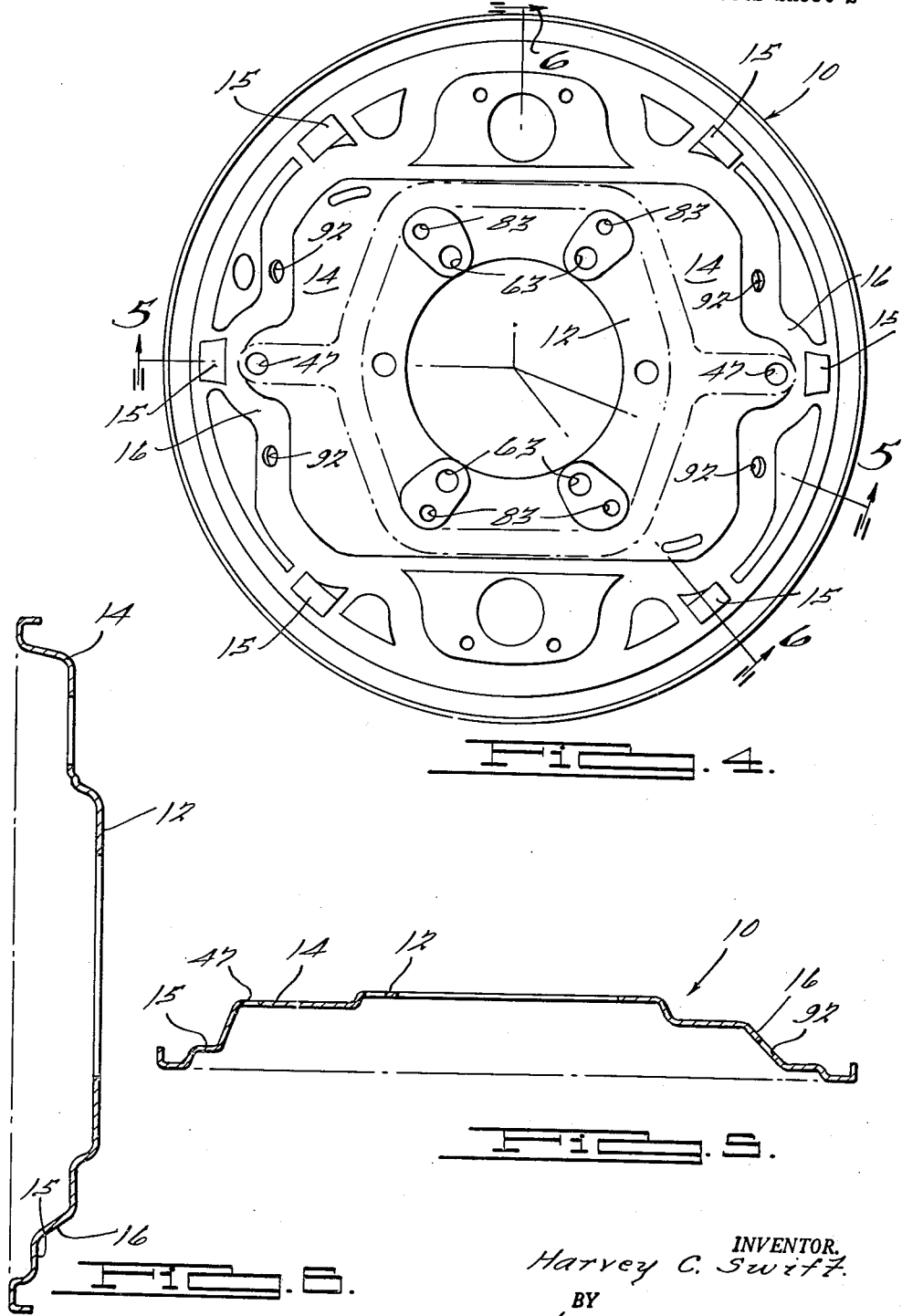

United States Patent Office 3,061,051
Patented Oct. 30, 1962

3,061,051
BRAKE ASSEMBLY
Harvey C. Swift, Birmingham, Mich., assignor to Kelsey-Hayes Company, Detroit, Mich., a corporation of Delaware
Filed Apr. 12, 1961, Ser. No. 102,602
10 Claims. (Cl. 188—78)

This invention relates to a brake assembly and more particularly to a brake assembly of the internal-expanding-shoe type.

The primary object of the present invention is to provide a brake assembly of the internal-expanding-shoe type having means for positively and reliably retracting the brake shoes away from the brake drum upon the release of braking pressure and without danger of the brake shoes becoming caught or accidentally held in contact with the brake drum.

A further object of this invention is to provide an improved brake shoe return spring system which is inexpensively manufactured and which is adapted to render service over a long, useful life without undue wear or destruction of parts.

Further objects, features and advantages of this invention will become apparent from a consideration of the following description, the appended claims and the accompanying drawing in which:

FIGURE 1 is an elevational view partially in section of a brake assembly constructed in accordance with the principles of the present invention;

FIG. 2 is a sectional view taken along the line 2—2 of FIGURE 1 looking in the direction of the arrows;

FIG. 3 is a vertical sectional view taken along the line 3—3 of FIG. 2 looking in the direction of the arrows;

FIG. 4 is an elevational view of a back plate portion of the brake assembly;

FIG. 5 is a sectional view taken along the line 5—5 of FIG. 4; and

FIG. 6 is a sectional view taken along the line 6—6 of FIG. 4 looking in the direction of the arrows.

Referring now to the drawings, my invention is illustrated in a brake assembly having a backing plate generally designated 10 provided with a flat annular center portion 12 connected to an axially offset outer portion 14. The outer peripheral portion of the backing plate 10 has a plurality of circumferentially spaced flats 15 for purposes to be discussed. An annular shoulder 16 extends axially inwardly from the offset portion 14. Any forces imposed on the backing plate 10 are absorbed by a rigid non-rotating member such as an axle housing on an automobile to which the backing plate 10 rigidly attaches.

The backing plate 10 carries diametrically opposed hydraulic wheel cylinders 18, 20 on the axially offset outer portion 14. Each wheel cylinder has oppositely disposed pistons 22, 24 reciprocally mounted therein which carry cup seals 26, 28, respectively, on their inner ends. A compression spring 30 axially abuts against cup seals 26, 28 for urging the opposed pistons 22, 24 apart. Each cylinder 18, 20 has an aperture 31 which connects to a conduit 32 and one cylinder has an aperture (not shown) which connects to a suitable hydraulic pressure source such as a conventional master cylinder. Pressure developed in the cylinders 18, 20 causes the pistons 22, 24 to move outwardly of the cylinders 18, 20 to push thrust rods 34 outwardly of the cylinders 18, 20. The outer end of each thrust rod 34 contacts arcuate oppositely disposed brake shoe portions, generally designated 36, 38 for moving them into engagement with a conventional rotatable brake drum 40.

Each arcuate shoe portion is of T-shaped cross section having a radially inwardly extending web portion 42 and a radially outer flange rim portion 44 which carries a suitable fibrous lining material 46 that extends laterally across the outer surface of the flange rim to engage a substantial portion of the inner surface of the rotatable brake drum 40. Each brake shoe portion is fastened to the axially offset outer portion 14 of the back plate 10 by posts (not shown) staked in apertures 47 in the back plate 10. The posts extend through oversized holes 48 in each of the brake shoe portions and receive washers 50. A castellated nut 52 threadingly engages each brake shoe mounting post to laterally position each of the brake shoe portions 36, 38 against the backing plate flats 15 which guide the flange rim portions 44. A cotter pin 54 locks the nut 52 in an adjusted position. The ends of each brake shoe portion 36, 38 have flat radially inwardly extending surfaces 56, 58.

The particular brake assembly illustrated herein has means for anchoring the brake shoes in the form of oppositely disposed lug assemblies generally designated 60 and 62 mounted radially inwardly of the brake cylinders 18 and 20 and between the brake shoe portions 36 and 38 by suitable fastening means such as studs 61 which extend through apertures 63 in the backing plate 10 to the axle. Each lug assembly 60, 62 has radial projections 64, 66 which extend outwardly on either end of the hydraulic cylinders 18, 20. Each projection 64 has a surface 65 which engages the surface 56 on an adjacent brake shoe portion to absorb the heavy shoe anchoring loads caused by braking torque upon forward wheel rotation indicated by the arrow F in FIGURE 1.

Each radial lug projection 66 has a threaded opening 68 formed therein, which receives the stem 70 of an adjusting screw generally designated 72. The head of each adjusting screw 72 has a serrated periphery 74, and a flat top surface 76 which constitutes an anchoring surface for the adjacent end of the brake shoe portions 36, 38. The adjusting screw 72 may be rotated to radially advance the brake shoe portions 36, 38 and compensate for lining wear.

Referring now particularly to the brake shoe return spring system, this system serves to retract the brake shoe portions 36, 38 away from the rotatable brake drum surface 40 during periods in which the cylinders 18, 20 are not pressurized. The system is illustrated with four compression springs 80 each of which has a radially inner end connected to a post 82 which extends axially outwardly from the lug assemblies 60, 62. The posts 82 extend through apertures 83 in the back plate 10 and are fastened thereto by flattened heads 84. The radially outer end of the spring 80 is connected to a lever 90 and is engaged in a groove adjacent the axially outer end 86 thereof. The spring 80 and lever 90 cooperate to urge the brake shoe portions 36, 38 away from the rotatable brake drum 40 in a highly effective manner which assures a positive return action.

Each compression spring 80 holds an end of the brake shoe portions 36, 38 against the backing plate flats 15 by engaging the brake shoe web 42. The lever 90 extends through an aperture 91 in the web 42 and pivots about the annular slanted shoulder 16 which has an aperture 92 through which the lever 90 extends axially inwardly. The end of the lever opposite the axially outer end 86 is offset therefrom and has a hemispherical or rounded end 94 which is of a greater diameter than the aperture 92 to prevent the spring 80 pulling the lever 90 therethrough. The offset end of the lever 90 is arranged substantially normal to the slanted shoulder 16 of the backing plate 10 so that the rounded surface 94 bears against the backing plate 10 through substantially 360°. Such an arrangement distributes the wear between the lever 90 and backing plate 10 and thereby increases the effective life of the return spring system. Additionally, the rounded surface 94 is held in tight engagement with the edge of the backing plate 10 defining the aperture 92 by the spring 80 to prevent the entrance of dirt, water and other foreign material through the aperture 92 into the working portion of the brake assembly. The lever 90 also has a bent portion 95 providing a rounded surface which abuts the wall of the aperture 92 and forms the location at which the face of the lever is applied to the brake shoe. As the lever is pivoted about the center of the rounded end 94, the bent portion 95 will rock slightly on the side wall of the aperture 92, without any tendency of the edge of the aperture 92 to dig into or gall the lever. Upon the application of the brakes, the hydraulic cylinders 18, 20 receive hydraulic fluid under pressure from the hydraulic pressure source causing the pistons 22, 24 to move outwardly. The outwardly moving pistons cause the thrust rods 34 to move the brake shoe portions 36, 38 into engagement with the rotatable braking drum 40. The arrow F indicates the forward direction of the rotatable brake drum 40. During this movement the surface 56 of each shoe portion 36, 38 contacts the surface 65 of each radial projection 64 causing a pivotal movement of each shoe portion 36, 38 into the drum 40. If the drum is rotating in the forward direction, the shoes will remain anchored to the projections 64 throughout the braking operation. If the drum is rotating in the opposite direction, the shoe portions 36, 38 will be moved by the drum to anchor against the surfaces 76 of the adjusting screws 72.

When the brake applying pressure is relieved, springs 80 will return the shoe portions 36, 38 to a released position in which both ends of both shoes are anchored. It will be seen that the force applied to the shoes by the lever 90 is in a direction parallel to the plane of the web portions 42 and perpendicular to the plane of the flange portions. Thus, the shoes slide smoothly on the backing plate and any tendency of the shoes to cock, which could prevent their return, is avoided.

It will be understood that the specific construction of the improved brake assembly which is herein disclosed and described is presented for purposes of explanation and illustration and is not intended to indicate limits of the invention, the scope of which is defined by the following claims.

What is claimed is:

1. In a brake, a rotatable brake drum, a backing plate having a center portion and a sloping shoulder portion, brake shoe portions each having an axially extending flange and a radially inwardly extending web portion movably connected to said backing plate, wheel cylinder means including force-transmitting means moving said brake shoe portions against said rotatable brake drum, a lever having one end projecting axially outwardly of said backing plate engaging one of said web portions, and spring means on said center portion engaging said axially outwardly projecting end of said lever for moving said brake shoe portions away from said rotatable drum when said force transmitting means is released, said lever having an opposite offset end which intersects said sloping shoulder portion in a substantially normal relationship, and means on said offset end for causing forces from said lever to act substantially normal to said sloping shoulder portion to reduce wear between said lever and said backing plate.

2. In a brake, a rotatable brake drum, a backing plate having a center portion, a sloping shoulder portion and an intermediate axially offset portion, brake shoe portions each having an axially extending flange and a radially inwardly extending web portion movably connected to said intermediate offset portion, wheel cylinder means including force transmitting means moving said brake shoe portions against said rotatable brake drum, means defining a first aperture in said web portion, means defining a second aperture in said shoulder portion, a lever projecting through said first and second apertures having an offset end which intersects said sloping shoulder portion in a substantially normal relationship, said offset end having a rounded end portion of greater diameter than said second aperture in load-bearing contact with the inside surface of said shoulder portion through approximately 360° for causing forces from said lever to act substantially normal to said sloping shoulder portion to reduce wear between said lever and said backing plate, said lever having an axially outer end with a bent portion therein which engages one of said web portions in a rocking relationship to prevent galling of said lever at said web portion, and spring means on said center portion engaging said axially outer end of said lever for moving said brake shoe portion away from said rotatable drum when said force transmitting means is released.

3. In a brake, a rotatable brake drum, a backing plate having a center portion, a sloping shoulder portion and an intermediate axially offset portion, anchor surface means on said center portion, brake shoe portions each having an axially extending flange and a radially inwardly extending web portion movably connected to said intermediate offset portion, wheel cylinder means including force transmitting means moving said brake shoe portions against said rotatable brake drum for moving said web portions against said anchor surface means, a lever having one end projecting axially outwardly of said backing plate engaging one of said web portions, and spring means on said center portion engaging said axially outer end of said lever for moving said brake shoe portions away from said rotatable drum when said force-transmitting means is released, said lever having an opposite offest end which intersects said sloping shoulder portion in a substantially normal relationship, and means on said offset end for causing forces from said lever to act substantially normal to said sloping shoulder portion to reduce wear between said lever and said backing plate, said axially outer end of said lever having a bent portion therein which engages one of said web portions in rocking relationship to prevent galling of said lever at said web portion.

4. In a brake, a rotatable brake drum, a backing plate having a center portion, a sloping shoulder portion and an intermediate axially offset portion, brake shoe portions each having an axially extending flange and a radially inwardly extending web portion movably connected to said intermediate offset portion, wheel cylinder means including force-transmitting means moving said brake shoe portions against said rotatable brake drum for moving said web portions against said anchor surface means, means defining a first aperture in one of said web portions, means defining a second aperture in said shoulder portion, a lever projecting through said first and said second apertures having an offest end which intersects said sloping shoulder portion in a substantially normal relationship, said offset end having a rounded end portion of greater diameter than said second aperture in load bearing contact with the inside surface of said shoulder portion through approximately 360° for causing forces from said lever to act substantially normal to said sloping shoulder portion to reduce wear between said lever and said backing plate, said lever having an axially outwardly directed end, and spring means on said center portion engaging said axially outer end of said lever for moving said brake shoe portion away from said rotatable drum when said force-transmitting means is released.

5. In a brake, a rotatable brake drum, a backing plate having a center portion, an axially offset outer portion and a sloping shoulder portion, lug means on said center portion having radially outwardly projecting anchoring surfaces, brake shoe portions having an axially extending flange and a radially inwardly extending web movably connected to said offset outer portion, wheel cylinder means including force transmitting means moving said brake shoe portions against said rotatable brake drum for moving said web portions against said anchoring surfaces, means defining a plurality of first apertures in said shoulder portion, a plurality of levers each having a rounded end portion engaging said shoulder portion at one of said first apertures, means defining a plurality of second apertures in said web portions, said levers extending axially outwardly through said second apertures each having an end portion axially outwardly of said web portions, and spring means on said lug means engaging said outer end portions for moving said brake shoe portions away from said rotatable drum when said force transmitting means is released.

6. In a brake, a rotatable brake drum, a backing plate having a center portion, an axially offset outer portion and a sloping shoulder portion, lug means on said center portion having radially outwardly projecting anchoring surfaces, brake shoe portions having an axially extending flange and a radially inwardly extending web portion, a plurality of circumferentially spaced aligning flats on the outer periphery of said backing plate, fastening means on said backing plate engaging the web portion of each brake shoe portion for holding it against one of said aligning flats, wheel cylinder means including force transmitting means moving said brake shoe portions against said rotatable brake drum for moving said web portions against said anchoring surfaces, a lever extending axially outwardly of said backing plate on either side of said fastening means, each lever engaging said sloping shoulder portion and said brake shoe web portion, springs on said lug means engaging the axially outer end of each of said levers for moving said brake shoe portions away from said rotatable drum and engaging said web for aligning the outer ends of said brake shoe portion against said aligning flats.

7. In a brake, a rotatable brake drum, a backing plate having a center portion, an axially offset outer portion and a sloping shoulder portion, lug means on said center portion having radially outwardly projecting anchoring surfaces, brake shoe portions having an axially extending flange and a radially inwardly extending web portion, a plurality of circumferentially spaced aligning flats on the outer periphery of said backing plate, fastening means on said backing plate engaging the mid-portion of each brake shoe portion for holding it against one of said aligning flats, wheel cylinder means including force transmitting means moving said brake shoe portions against said rotatable brake drum for moving said web portions against said anchoring surfaces, a plurality of means defining first apertures in said shoulder portion, a plurality of levers each having a rounded end portion engaging said shoulder portion around said first apertures, means defining second apertures in the web portions of said brake shoe portions, said levers extending axially outwardly through said web apertures each having an end portion axially outwardly of said web portions, springs on said lug means engaging the axially outer end portion of said levers for moving said brake shoe portion away from said rotatable drum and engaging said web portion for aligning the outer ends of each of said brake shoe portions against said aligning flats.

8. In a brake, a rotatable brake drum, a backing plate having a center portion, an axially offset outer portion and a sloping shoulder portion, diametrically spaced lugs on the inner periphery of said center portion, each lug having spaced apart radially outwardly extending projections having anchoring surfaces, diametrically spaced brake shoes having axially extending flanges and radially inwardly extending web portions movably connected to said offset outer portion, diametrically spaced wheel cylinder means on said axially offset outer portion having force transmitting means moving said brake shoes against said rotatable brake drum for moving said web portions against said anchoring surfaces, axially outwardly projecting posts on each of said lugs, means defining apertures in said shoulder portion, a plurality of levers extending through said first apertures each having a rounded end portion which engages said shoulder portion through approximately 360° at said first aperture, means defining apertures in said web portions, said levers extending axially outwardly through said web apertures having end portions axially outwardly of said web portions, and spring means on said posts engaging said outer end portions for moving said brake shoes away from said rotatable drum when said force transmitting means is released.

9. In a brake, a rotatable brake drum, a backing plate having a center portion, an axially offset outer portion and a sloping shoulder portion, diametrically spaced lugs on the inner periphery of said center portion, each lug having spaced apart radially outwardly extending projections having anchoring surfaces, diametrically spaced brake shoes having axially extending flanges and radially inwardly extending web portions movably connected to said offset outer portion, diametrically spaced wheel cylinder means on said axially offset outer portion having force transmitting means moving said brake shoes against said rotatable brake drum for moving said web portions against said anchoring surfaces, a plurality of circumferentially spaced aligning flats on the outer periphery of said backing plate, fastening means on said backing plate engaging the web portion of each brake shoe for holding it against one of said aligning flats, axially outwardly projecting posts on said lugs, a lever extending axially outwardly of said backing plate on either side of said fastening means, each lever engaging said sloping shoulder portion and said brake shoe web, a spring on each of said outwardly projecting posts engaging the axially outer end of said lever for moving said brake shoes away from said rotatable drum and engaging said web for aligning the outer ends of said brake shoes against said aligning flats.

10. In a brake, a rotatable brake drum, a backing plate having a center portion, an axially offset outer portion and a sloping shoulder portion, diametrically spaced lugs on the inner periphery of said center portion, each lug having spaced apart radially outwardly extending projections having anchoring surfaces, diametrically spaced brake shoes having axially extending flanges and radially inwardly extending web portions movably connected to said offset outer portion, diametrically spaced wheel cylinder means on said axially offset outer portion having force transmitting means moving said brake shoes against said rotatable brake drum for moving said web portions against said anchoring surfaces, a plurality of circumferentially spaced aligning flats on the outer periphery of said back plate, fastening means on said backing plate engaging the web portion of each brake shoe for holding it against one of said aligning flats, axially outwardly projecting posts on said lugs, a plurality of means defining first apertures in said shoulder portion, a plurality of levers each having a rounded end portion engaging said shoulder portion around said first apertures, means defining second apertures in the web portions of said brake shoes, said levers extending axially outwardly through said web apertures each having an end portion axially outwardly of said web portions, a spring on each of said outwardly projecting posts engaging the axially outer end portion of said levers for moving said brake shoes away from said rotatable drum and engaging said web for aligning the outer ends of each of said brake shoes against said aligning flats.

References Cited in the file of this patent
UNITED STATES PATENTS

| 2,095,753 | La Brie | Oct. 12, 1937 |
| 2,251,854 | Parnell et al. | Aug. 5, 1941 |
| 2,822,065 | Goepfrich et al. | Feb. 4, 1958 |